United States Patent [19]

Tafara et al.

[11] 4,390,425
[45] Jun. 28, 1983

[54] HIGH PRESSURE LIQUID FILTER VESSEL

[76] Inventors: Peter T. Tafara, 4803 Spring St., Neptune, N.J. 07753; Warren R. Fink, 23 Arbor Way, Wayside, N.J. 07712

[21] Appl. No.: 359,918

[22] Filed: Mar. 19, 1982

[51] Int. Cl.³ .............................................. B01D 29/00
[52] U.S. Cl. ..................................... 210/232; 210/448; 210/452
[58] Field of Search ............... 210/447, 448, 451, 452, 210/457, 478, 483, 81, 84, 85, 90, 232, 238; 248/68 R, 69

[56] References Cited

U.S. PATENT DOCUMENTS

| | | | |
|---|---|---|---|
| 948,180 | 1/1908 | Marie | 210/232 |
| 999,759 | 8/1911 | Oondey et al. | 210/90 |
| 2,130,287 | 9/1938 | Nooney | 210/451 |
| 2,727,634 | 12/1955 | O'Meara | 210/446 |
| 3,147,220 | 9/1964 | Avery | 210/315 |
| 3,640,392 | 2/1972 | Smith et al. | 55/373 |
| 3,931,015 | 1/1976 | Jenkins | 210/232 |
| 4,253,959 | 3/1981 | Tafara | 210/452 |

FOREIGN PATENT DOCUMENTS 580880  9/1977  U.S.S.R. .................. 210/90

*Primary Examiner*—John Adee
*Attorney, Agent, or Firm*—Martin Sachs

[57] ABSTRACT

A high pressure liquid filter vessel fabricated of nonmetallic materials and used for the filtering of liquid in a permanent installation provides for a simplified method of replacing the filter bag and includes a removable cover which displaces a relatively large volume of liquid. Removal of the cover from the filter housing reduces the liquid level within the housing to a level below the lip of the filter bag, making it easier to grab the lip thereof, and remove the bag without coming into contact with the liquid being filtered. The bracket used for retaining the cover on the filter housing prevents distortion thereof and makes the filter ideally suitable for high pressure filter applications where corrosive liquids are involved.

14 Claims, 5 Drawing Figures

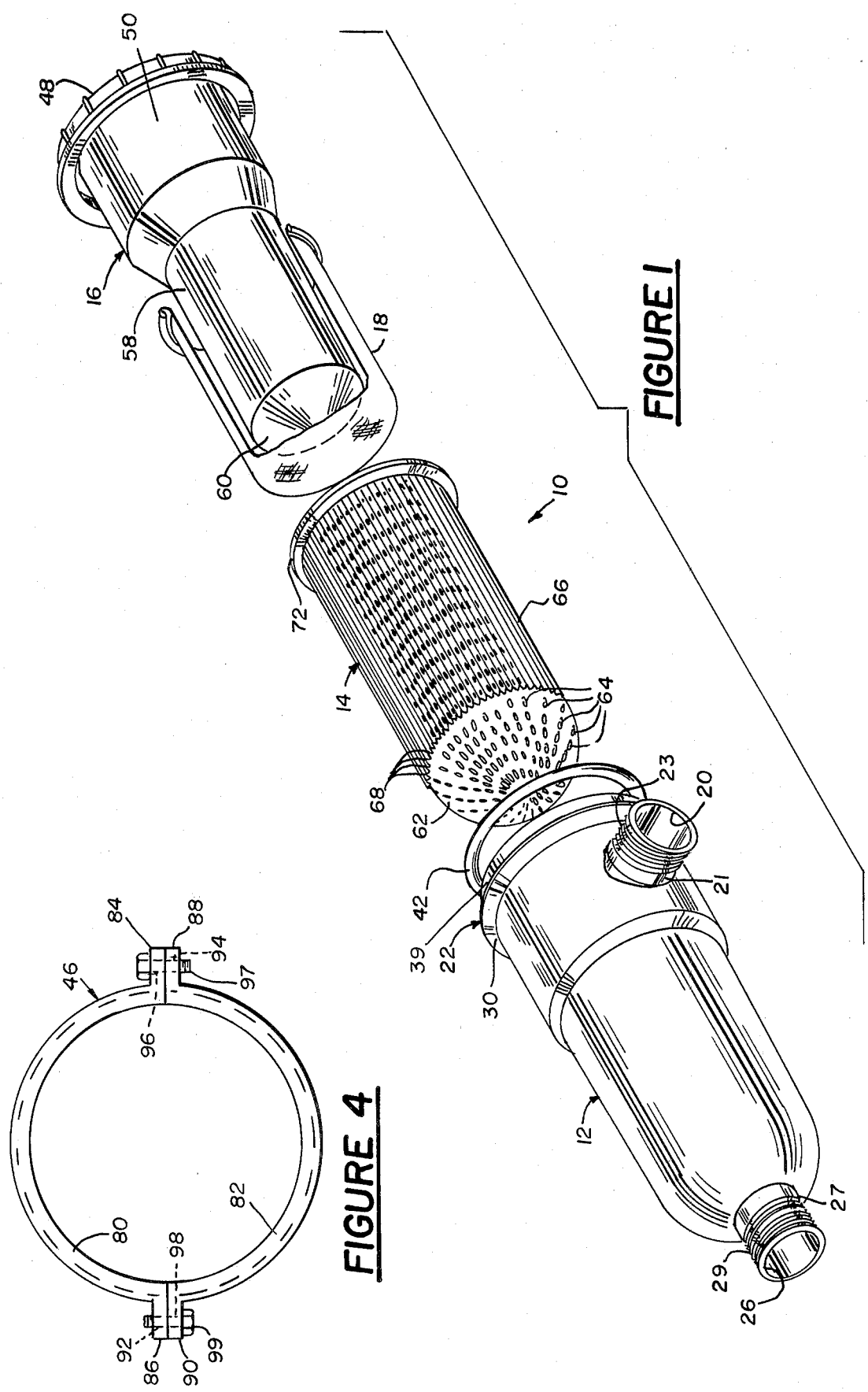

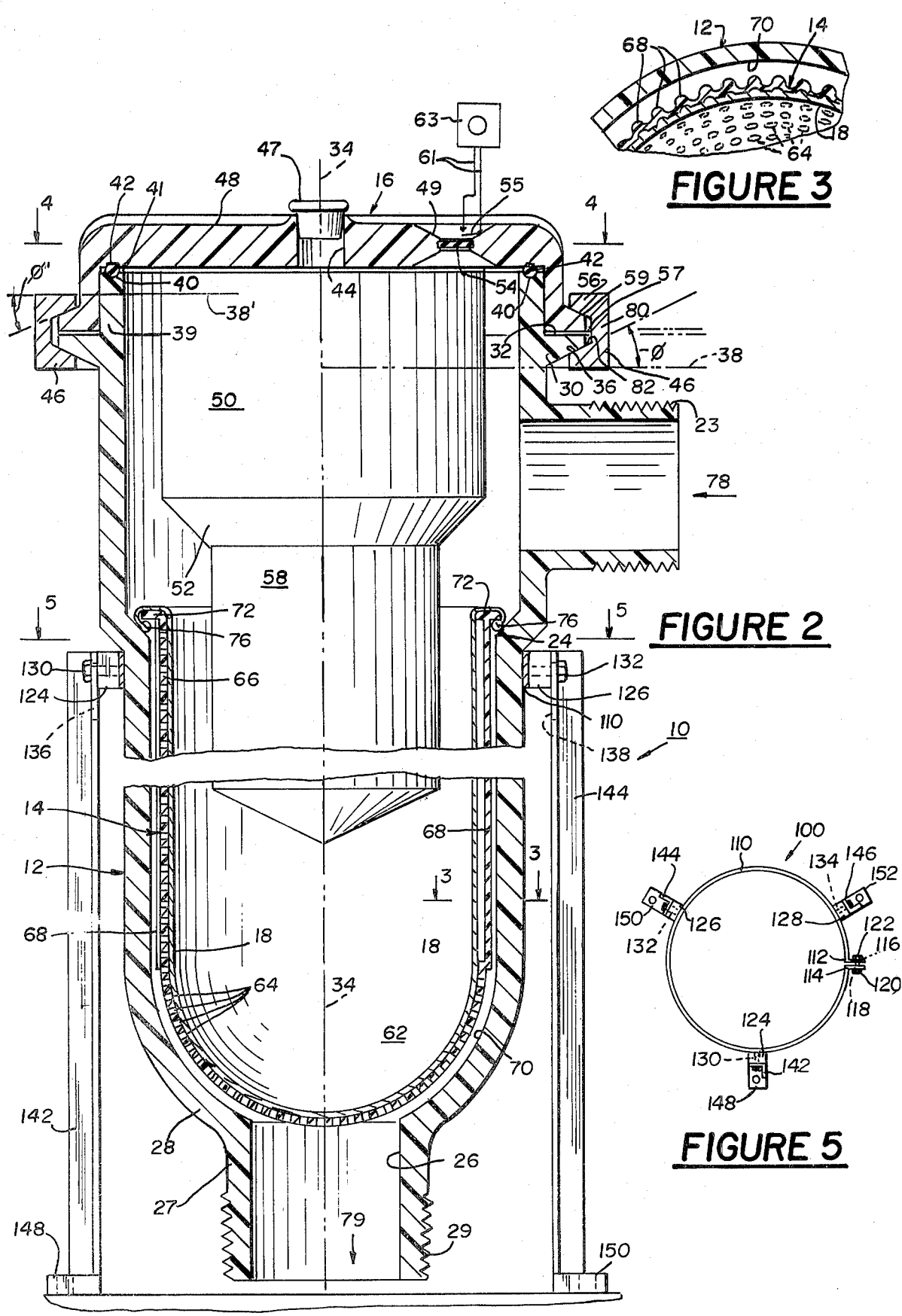

HIGH PRESSURE LIQUID FILTER VESSEL

BACKGROUND OF THE INVENTION

1. Field of the Invention

The present invention relates to filters, and in particular, to a high pressure liquid filter vessel which provides for easy replacement of the associated filter bag, without contaminating the fluid remaining in the housing.

2. Description of the Relevant Art

Many different filters are in use today in industry. A major concern with the industrial type filter is the ease in which the filter elements can be replaced, since it requires shut-down of the production facility in order to provide this type of maintenance. Many elaborate arrangements are utilized to make the time consuming job of changing filters acceptable. One approach for simplifying this task is disclosed in U.S. Pat. No. 3,640,392 issued to E. A. Smith, et al. on Feb. 8, 1972. The Smith, et ai. disclosure overcame the problems known in the prior art, by eliminating the need for disconnecting couplings, flexible hoses, or other types of mechanisms for manually disconnecting the liquid inlet line, in order to open the top of the filter vessel. The apparatus disclosed therein provides for a permanent plumbing connection for the pressurized liquid being filtered and does not interfere with the easy opening of the vessel for inspection, replacement of the filter bag and cleaning. The vessel is provided with a cover connected by a unique hinge, contains a basket supported filter bag for filtering the liquid under pressure that enters the mouth of the bag through an inlet in the cover and is discharged through an outlet in the bottom of the vessel. The hinge is provided with a liquid inlet passage which communicates with a liquid supply plumbing connection that is permanently affixed and need not be disturbed when the cover is opened or closed. An annular seal is provided by the rim of the filter basket disposed on the annular wall of the body of the vessel so that when the cover is closed and clamped, leakage of the pressurized liquid is prevented above the bag, as well as from the vessel itself. The plumbing required to provide for a pressurized liquid into the cover arrangement as disclosed, requires a movable plumbing joint which has a tendency to wear with time, and thereby, permits the pressurized fluid to leak out of the connection. The filter basket requires a unique configuration and utilizes a pair of O-rings to provide the liquid seal in order to prevent leakage between the cover and the vessel housing.

Other techniques have been utilized to maintain a filter in fixed relation between a pair of members such as a cover and a housing. Typical of these is U.S. Pat. No. 2,727,634 issued on Dec. 20, 1955 to J. P. O'Meara which discloses upper and lower housing elements having a rubber O-ring and filter disposed therebetween. The housings are held together by a U-shaped bracket arrangement or strap which is wrapped around the assembly and tightened down. However, this arrangement requires that the housing be rigid, therefore, metallic, and does not insure equal pressures being applied completely around the circumference, since the strap exerts pressure on half-circle bands having spaces therebetween.

Another embodiment is disclosed in U.S. Pat. No. 3,147,220 issued to T. P. Avery on Sept. 1, 1964, wherein a U-shaped band assembly, utilizing four hingeable segments, sandwiches a cover flange and a housing flange with a gasket therebetween in order to provide a pressurized seal. Hereagain, the filter housing and clamp must be made of metal and with a segmented bracket assembly as disclosed the pressure is only equalized because the elements are all non-resilient metal.

Another filter arrangement is disclosed in U.S. Pat. No. 3,931,015 issued to B. M. Jenkins on Jan. 6, 1976 wherein the cover of the filter vessel is held to the housing by a U-shaped flexible clamp applying pressure to a flange provided on the cover and housing, which sandwich a rubber or resilient gasket therebetween. Here again, in order to maintain a high pressure arrangement the cover and housing were required to be made of metal, which is not suitable for the filtering of corrosive liquids.

A further attempt to overcome the shortcomings heretofore mentioned is disclosed in U.S. Pat. No. 4,253,959 issued to P. T. Tafara on Mar. 3, 1981. The disclosure therein utilizes a non-metallic cover and housing which provides a seal by threadedly engaging the cover to the housing with an O-ring disposed along the vertical housing wall above the threaded portion that comes into intimate contact with the inner wall of the cover as the cover is threaded thereon. This type of arrangement, although adequate for low pressure applications, is not suitable for high pressure use because of the difficulty in maintaining tolerances in production.

SUMMARY OF THE INVENTION

Therefore, it is an object of the present invention to overcome the shortcomings found in the prior art by providing a high pressure filter vessel capable of use with corrosive liquids.

It is another object of the present invention to provide a high pressure filter vessel fabricated of a non-metallic material capable of operating at pressures in excess of seventy-five pounds per square inch.

It is a further object of the present invention to provide a high pressure filter vessel having simplified means for removing the filter bag without coming into contact with the liquid being filtered.

It is yet another object of the present invention to provide a high pressure filter vessel for corrosive liquids suitable for manufacture with mass production techniques.

It is still another object of the present invention to provide a high pressure non-metallic filter vessel which is relatively inexpensive to manufacture.

The present invention overcomes the shortcomings found in the known art, by providing a filter vessel which is fabricated of non-metallic parts, is capable of being used under high pressures, and is ideally suited for industrial usage where contamination of the liquids being filtered is of major importance, as well as, the amount of down time required to change the filter element. Also included are safety features which indicate when excessive pressures are generated by clogging of the filter.

A high pressure liquid filter vessel, according to the principles of the present invention, comprises an elongated hollow housing having an open end and a closed end. The housing is provided with an internally protruding ledge disposed away from the open end, inlet and outlet ports and a circumferentially, outwardly extending, flange portion disposed proximate the open end. The inlet port is disposed between the ledge and the open end. The outlet port is generally centrally disposed in the closed end. The outwardly extending flange portion is provided with an upper surface generally perpendicular to the longitudinal axis of the housing and a lower surface sloped towards the flange upper surface at an acute angle from a line drawn perpendicular to the axis. A filter bag having a roll-over edge is also included. A porous basket is disposed within the housing and has a plurality of axially disposed and closely spaced external ribs for strengthening the basket and positioning the basket away from the internal wall of the housing to enhance the liquid flow. The basket is also provided with an outwardly extending flange portion for cooperating with the housing ledge and centrally positioning the basket within the housing while simultaneously positioning and retaining the roll-over edge of the filter bag between the flange portion and the housing ledge. A cover cooperates with the housing open end and seals it. The cover is provided with a circumferentially outwardly extending flange portion and a centrally disposed portion adapted to be received by the filter bag and gasket. The outwardly extending cover flange portion is provided with a lower surface generally perpendicular to the longitudinal axis of the cover and an upper surface sloped towards the flange lower surface at an acute angle from a line drawn perpendicular to the cover axis. A circular non-resilient bracket, which is formed in two halves, each being provided with a pair of inwardly extending sloped surfaces at the same acute angle as provided on the housing sloped surface and the cover sloped surface, is adapted to cooperate therewith. A fastening device is disposed proximate the ends of each of the brackets for positioning the brackets in their original circular shape while retaining the housing and cover in sealed relationship between the bracket sloped surfaces. The cover, housing, filter bag and basket are fabricated from non-metallic materials.

BRIEF DESCRIPTION OF THE DRAWING

In order that the invention may be more fully understood, it will now be described, by way of example, with reference to the accompanying drawing, in which:

FIG. 1 is an exploded isometric view of the liquid filter vessel, according to the principles of the present invention;

FIG. 2 is a cross-sectional view in elevation of the filter vessel of FIG. 1 fully assembled;

FIG. 3 is an exploded partial view taken along the line 3—3 of FIG. 2;

FIG. 4 is a view taken along the line 4—4 of FIG. 2, showing a bracket that retains the cover on the filter housing; and FIG. 5 is a view taken along the line 5—5 of FIG. 2, showing a filter stand.

DESCRIPTION OF THE PREFERRED EMBODIMENT

Referring now to the figures, and in particular to FIGS. 1 and 2, there is shown a high pressure liquid filter vessel 10 which includes a housing 12, a porous basket 14 and a cover assembly 16. The porous basket 14 is adapted to receive a filter bag 18 therein, which is of conventional design.

The housing 12 is provided with an inlet aperture 20, disposed in an extending portion 21 of the housing 12 which has external threads 23 provided thereon for receiving a cooperating threaded nipple provided on an input pipe, not shown. The inlet aperture 20 is disposed proximate the open end 22 of the housing 12, between the edge thereof and an internally extending ledge 24. In the preferred embodiment, the housing 12 is tubularly-shaped, so that the ledge 24 extends completely around the internal circumference of the housing 12. The ledge 24 is preferably sloped downwardly and its function will be explained in more detail hereinafter. The housing 12 is also provided with an outlet aperture 26, preferably centrally disposed on an extending portion 27, centrally disposed at the bottom closed end 28 of the housing. The end of the extending portion 27 is provided with an external thread 29 which is adapted to cooperate with a threaded nipple on a conventional plumbing line, not shown.

The open end 22 of housing 12 is also provided with an extending edge portion 39 and an outwardly extending flange portion 30 which has an upper surface 32 which is generally perpendicular to the longitudinal axis 34 of the housing 12 and a lower surface 36 sloped towards the upper surface 32 at an acute angle $\phi$ and a line 38 drawn perpendicular to the axis 34. The angle $\phi$ preferably being between 7 and 40 degrees. The flange portion 30 extends circumferentially around the housing 12. The extending edge portion 39 of the housing 12 includes a groove 40, located at the distal end 41, into which may be inserted a resilient O-ring 42 to improve the sealing qualities of the vessel, once the cover 16 is positioned thereon.

The cover assembly 16 is preferably circularly-shaped and is adapted to cooperate with the distal end 41 and the flange portion 30 of the housing 12 completing the sealed liquid filter vessel 10. Centrally disposed from the upper portion 48 of the cover assembly 16 is a cylindrically shaped first portion 50, which is affixed to the upper portion 48 by any suitable means, such as by chemical bond, gluing, or alternatively, molded as one solid piece. The first portion 50 is hollow and extends away from the upper portion in a downwardly direction, as shown in FIG. 2 and is provided with a tapered edge 52 which terminates in a second conically-shaped portion 58, that extends coaxially in a downwardly direction and preferably terminates in a conically-shaped end 60 which extends into the porous basket 14. The first portion 50 and the second portion 58 are specifically designed to displace a relatively large volume of liquid, the purpose of which will be explained hereinafter. Portions 50 and 58 may be made from hollow members with a solid top or upper portion 48 placed thereon, in order to conserve raw material. The upper portion 48 is provided with an aperture 44 through which may be inserted, sand, gravel, lead shot, etc., for the purpose of providing mass so that the cover can not be urged upwardly when the mounting clamp or bracket 46 is removed from the filter vessel 10 to change the filter bag 18. A cap or plug 47 may be used to close the aperture 44. Additionally, the upper portion 48 may be provided with a narrow portion 49 which is adapted to receive a blow-out plug 54 of conventional design, which will blow if the pressure in the filter vessel is to exceed a predetermined amount because of the filter bag 18 becoming clogged with debris. Attached to the filter plug 54 may be included a sensor 55 of any known type that will be activated by the blowing out of the blow-out plug 54 so that a sensing circuit arrangement 63 of conventional design connected to the sensor 55 by means of leads 61 can provide audible and/or visual indication that the filter vessel 10 is not operating in a proper manner. The upper portion 48 of the cover 16 is provided with a circumferentially outwardly extending flange portion 56 which has a lower surface 57 generally perpendicular to the longitudinal axis 34 of the housing 12 and an upper surface 59 sloped towards the lower surface 57 at an acute angle φ' formed by a line 38' drawn perpendicular to the housing axis. Preferably the acute angle φ' and the angle φ' are equal and are between 7 and 40 degrees.

The porous basket 14 is preferably cylindrically-shaped, terminating in essentially a hemisphere 62 and includes a plurality of apertures 64 located throughout the end surface 66. The cylindrically-shaped end surface 66 is provided with a plurality of axially disposed ribs 68 extending outwardly. The apertures 64 are spaced inbetween the ribs 68 and readily provides for liquid flow therethrough. The ribs 68 provide a dual function; they strengthen the basket and also insure that the surface 66 does not come into contact with the inner surface 70 of the housing 12. The open end of basket 14 is provided with an outwardly extending flange 72. The protruding lip portion 76 of a conventional filter bag 18 is normally provided with a molded ring of compatable material and is disposed within the basket 14. The lip portion 76 of the filter bag 18 is preferably $\frac{1}{4}$ inch to $\frac{1}{2}$ inch less than the diameter of lip 72, stretched over the flange 72 and is locked in position thereunder by the weight of the basket 14 and is helped to be retained in position by the weight of the liquid entering the filter vessel 12.

Preferably the cover assembly 16, porous basket 14 and housing 12 are fabricated from high density polypropylene or thermoplastic material, such as TEFLON and nylon, and therefore is ideally suited for use with corrosive acids or other materials, since the polypropylene will not interact with them or cause any contamination.

FIG. 3 shows an enlarged portion of the housing 12 with the ribbed basket 14 positioned thereon. The filter bag 18 is also shown in its relative position in the basket 14.

FIG. 4 is a top or plan view of the circularly shaped non-resilient clamp or bracket 46 which, when completely assembled, forms a circle completely surrounding the flange portions 30 and 56 of the housing 12 and cover assembly 16. Preferably the inner sloped U-shaped surfaces 80 and 82 (see FIG. 2) of the bracket 46 are made to slope at the same angle as the sloped surfaces on the flanges 30 and 56 and they are adapted to cooperate with and be in intimate contact completely around the circumference when tightened to form a circle with essentially no space provided between the mating halves 80 and 82 of the bracket 46. Thus any distortions which may occur due to tolerance, errors in production, temperature changes, pressure of the liquid system, etc. of the flange portions 30 and 56 will be completely eliminated by the pressure exerted by the bracket 46 when it is in position. Preferably each bracket half is provided with a pair of outwardly extending flange portions 84 and 86, and 88 and 90. Flange portion 86 and 88 are provided with threaded apertures 92 and 94, respectively, and flange portion 84 and 90 are provided with clearance apertures 96 and 98 which are adapted to receive threaded bolts 97 and 99 therein so that upon tightening of the threaded bolts 97 and 99 the bracket 46 may be pulled together forming a circle and clamping the cover 16 to the filter vessel housing 12 forming a liquid seal therebetween.

FIG. 5 is a top or plan view of the support bracket assembly 100 which may be used to position the filter vessel 10 at appropriate level above a surface. The bracket assembly includes a circumferentially disposed support ring 110 which preferably is provided with outwardly extending flanges 112 and 114 on either end. The flanges are provided with apertures 116 and 118 through which a conventional nut 120 and bolt 122 may be used to tighten the support ring around the circumference of the filter vessel housing 12. Disposed about the surface of support ring 110 are three equally spaced threaded blocks 124, 126 and 128 which are adapted to receive therein threaded bolts 130, 132 and 134. Each of the bolts 130, 132 and 134 are adapted to be received in elongated slots or openings 136, 138 and 140 provided in L-shaped support legs 142, 144 and 146. Tightening bolts 130, 132 and 134 with the legs 142, 144 and 146 adjusted to a suitable level, will permit the filter vessel 10 to stand at any desired height and will enable the plumbing connections to be made to the inlet aperture 20 and outlet aperture 26. The legs 142, 144 and 146 may be provided with right angle feet 148, 150 and 152 so that they may be bolted to a level surface for a more rigid support of the filter vessel 10.

In operation, the filter bag 18 is inserted into the porous basket 14 with the lip portion 76 of the filter bag being placed over the flange 72 of the filter basket and carefully placed into the hollow housing 12 where the external corner of flange 72 rests upon the lip portion of the filter bag as it is pressed to the sloped ledge 24 by the weight of the filter basket 14 and filter bag 18. The cover assembly 16 is placed onto the housing 12 with the bracket 46 place thereover and tightened down by means of threaded bolts 97 and 99, thus making a firm seal between the cover and housing. The plug 47 may then be removed and filled with a granular mass and/or liquid as explained earlier to prevent the cover assembly 16 from rising upwardly when filled with liquid and the bracket 46 is removed. When liquid, under pressure, is applied in the direction of arrow 78 to the filter vessel housing 12, is dispursed about the circumference of the cylindrically-shaped first portion 50. Unfiltered liquid is unable to flow around the outside of the filter basket 14 since the external edge of flange 72 is in intimate and pressure contact with the lip portion of the filter bag forcing it in intimate contact with the sloped ledge 24 provided in the housing 12. The liquid will therefore be directed about the circumference of the first portion 50, be required to flow through the filter bag 18 and then through the apertures provided in the porous basket 14, and thence exit from the outlet aperture 26 in the direction of arrow 79. Foreign bodies appearing in the liquid to be filtered are trapped by the filter bag and retained therein as the fluid flows therethrough. The rib portion 68 of the porous basket 14 insures that the fluid flow is enhanced as it flows through the apertures 64 therein, since they are spaced from the inner wall 70 of the housing 12.

After a period of time when the flow through the filter has been reduced because of foreign particles captured therein, or alternatively after a prescribed period of operation, the system may be shut down and the filter bag replaced. By removal of the bracket 46 with the fluid pressure turned off, the liquid in the housing 12 will fall below the lip 76 on the filter basket, thereby preventing any particles which have been captured by the filter basket from returning back into the input flow path. The lip of the filter bag is readily accessible and, therefore, the filter bag may be easily removed from the housing 12. A new filter bag may be inserted in the porous basket 14 by placing it therein, or the filter basket may be removed from the housing for inspection.

Should the filter basket and filter become filled or clogged with foreign particles and the pressure to build up in the filter vessel, the blow-out plug 54 will fracture thereby activating the sensor and circuit arrangement giving both an audible and/or visual indication that the filter bag must be changed.

Hereinbefore, has been disclosed a high pressure liquid filter vessel which provides for efficient, relatively maintenance free filtering of corrosive liquids, and prevents the contamination of the fluid being filtered when the filter bag is replaced. It will be understood that various changes the details, materials, arrangement of parts and operating conditions, which have been herein described and illustrated in order to explain the nature of the invention, may be made by those skilled in the art within the principles and the scope of the instant invention.

Having thus set forth the nature of the invention, what is claimed is:

1. A high pressure liquid filter vessel comprising:
 (a) an elongated hollow housing having an open end and a closed end, said housing being provided with an internally protruding ledge disposed away from said open end, inlet and outlet means and a circumferentially outwardly extending flange portion disposed proximate said open end, said inlet means being disposed between said ledge and said open end, said outlet means being generally centrally disposed in said closed end, said outwardly extending flange portion being provided with an upper surface generally perpendicular to the longitudinal axis of said housing and a lower surface sloped towards said flange upper surface at an acute angle from a line drawn perpendicular to said axis;
 (b) a filter bag having a roll-over ringed edge;
 (c) porous basket means disposed within said housing having a plurality of axially disposed and closely spaced external ribs for strengthening said basket means and positioning said basket means away from the internal wall of said housing to enhance the liquid flow and an outwardly extending flange portion for cooperating with said housing ledge and centrally positioning said basket means within said housing while simultaneously positioning and retaining said roll-over edge of said filter bag between said flange portion and said housing ledge;
 (d) cover means for cooperating with said housing open end and sealing it, said cover means being provided with a circumferentially outwardly extending flange portion and a centrally disposed extending portion adapted to be received by said filter bag and basket means, said outwardly extending flange portion being provided with a lower surface generally perpendicular to the longitudinal axis of said housing and an upper surface sloped towards said flange lower surface at an acute angle from a line drawn perpendicular to said housing axis;
 (e) circular non-resilient bracket means formed in two halves and each being provided with a pair of inwardly extending sloped surfaces at the same acute angle as provided on said housing sloped surface and said cover means sloped surface and adapted to cooperate therewith; and
 (f) fastening means disposed proximate the ends of each of said bracket means for positioning said bracket means in its original circular shape while retaining said housing and cover means in sealed relationship between said bracket means sloped surfaces.

2. A high pressure liquid filter vessel according to claim 1 wherein said housing, basket means and cover means are fabricated from polypropylene.

3. A high pressure liquid filter vessel according to claim 1 further including a resilient O-ring disposed within a groove provided in the open distal end of said housing.

4. A high pressure liquid filter vessel according to claim 1 wherein said cover means extending portion displaces a sufficient volume of liquid so that upon removal of said cover means, the remaining liquid in said housing is below the level of the edge of said filter bag.

5. A high pressure liquid filter vessel according to claim 4 wherein said cover means extending portion includes means for inserting mass therein to prevent said cover from floating in said liquid when said bracket means is removed from said filter vessel.

6. A high pressure liquid filter vessel according to claim 1 further including receiving means for inserting a mass into said cover means extending portion when said filter vessel is completely assembled.

7. A high pressure liquid filter vessel according to claim 1 further including excessive pressure protection means for preventing damage to said filter vessel if said operating pressure should become excessive.

8. A high pressure liquid filter vessel according to claim 7 wherein said excessive pressure means provides audible indication when said pressure is exceeded.

9. A high pressure liquid filter vessel according to claim 8 wherein said excessive pressure means provides visual indication when said pressure is exceeded.

10. A high pressure liquid filter vessel according to claim 1 wherein said cover upper surface acute angle and said housing lower surface acute angle are equal.

11. A high pressure liquid filter vessel according to claims 1 or 10 wherein said cover upper surface acute angle and said housing lower surface acute angle are between 7 degrees and 40 degrees.

12. A high pressure liquid filter vessel according to claim 1 or 10 wherein said cover surface acute angle and said housing lower surface acute angle are 20 degrees.

13. A high pressure liquid filter vessel according to claim 1 further including support means comprising:
 (a) a circumferentially disposed support ring for affixing said ring on said filter housing and having adjustment means thereon, said support ring being provided with at least three equally spaced mounting brackets disposed thereabout; and
 (b) a plurality of support legs, one for each of said mounting brackets, adapted to be held therein and adjusted to maintain said filter vessel above a surface.

14. A high pressure liquid filter vessel comprising:
 (a) an elongated hollow housing having an open end and a closed end, said housing being provided with an internally protruding ledge disposed away from said open end, inlet and outlet means and a circumferentially outwardly extending flange portion disposed proximate said open end, said inlet means being disposed between said ledge and said open end, said outlet means being generally centrally disposed in said closed end, said outwardly extending flange portion being provided with an upper surface generally perpendicular to the longitudinal axis of said housing and a lower surface sloped towards said flange upper surface at an acute angle from a line drawn perpendicular to said axis;

(b) a filter bag having a roll-over ringed edge;

(c) porous basket means disposed within said housing having a plurality of axially disposed and closely spaced external ribs for strengthening said basket means and positioning said basket means away from the internal wall of said housing to enhance the liquid flow and an outwardly extending flange portion for cooperating with said housing ledge and centrally positioning said basket means within said housing while simultaneously positioning and retaining said roll-over edge of said filter bag between said flange portion and said housing ledge;

(d) cover means for cooperating with said housing open end and sealing it, said cover means being provided with a circumferentially outwardly extending flange portion and a centrally disposed extending portion adapted to be received by said filter bag and basket means, said outwardly extending flange portion being provided with a lower surface generally perpendicular to the longitudinal axis of said housing and an upper surface sloped towards said flange lower surface at an acute angle from a line drawn perpendicular to said housing axis, said extending portion including means for inserting mass therein to prevent said cover means from floating in said liquid;

(e) circular non-resilient bracket means formed in two halves each said halves being provided with a pair of inwardly extending sloped surfaces at the same acute angle as provided on said housing sloped surface and said cover means sloped surface adapted to cooperate therewith;

(f) fastening means disposed proximate the ends of each of said bracket means for positioning said bracket means in its original circular shape while retaining said housing and cover means in sealed relationship between said bracket means sloped surfaces, said cover means, housing, filter bag and basket means being fabricated from non-metallic materials; and (g) excessive pressure means for preventing damage to said filter vessel if said operating pressure should become excessive.

* * * * *